F. H. BAUER.
RESILIENT WHEEL.
APPLICATION FILED NOV. 13, 1917.
1,287,185.
Patented Dec. 10, 1918.
4 SHEETS—SHEET 2.
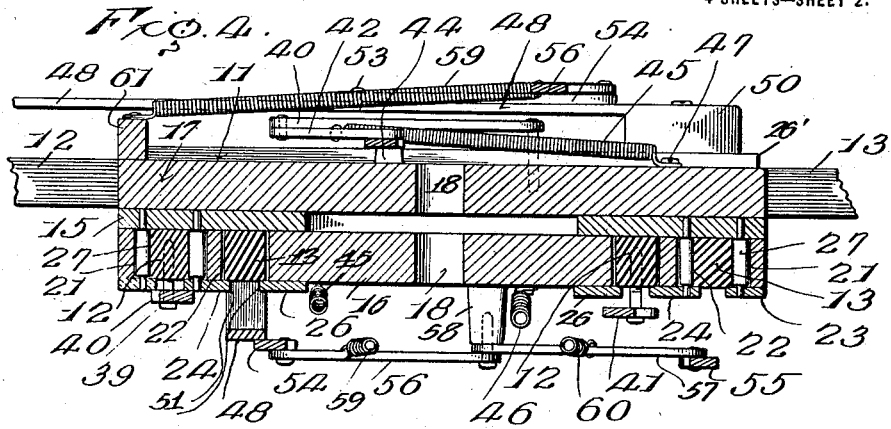
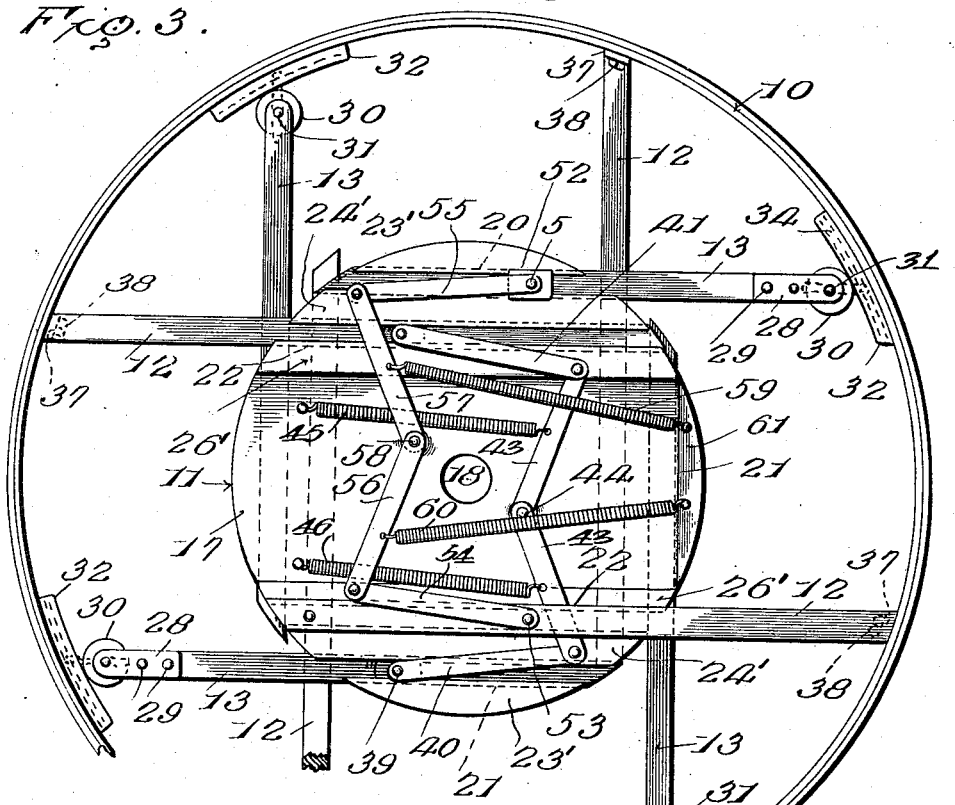
Inventor
F. H. Bauer.
By
Attorneys.

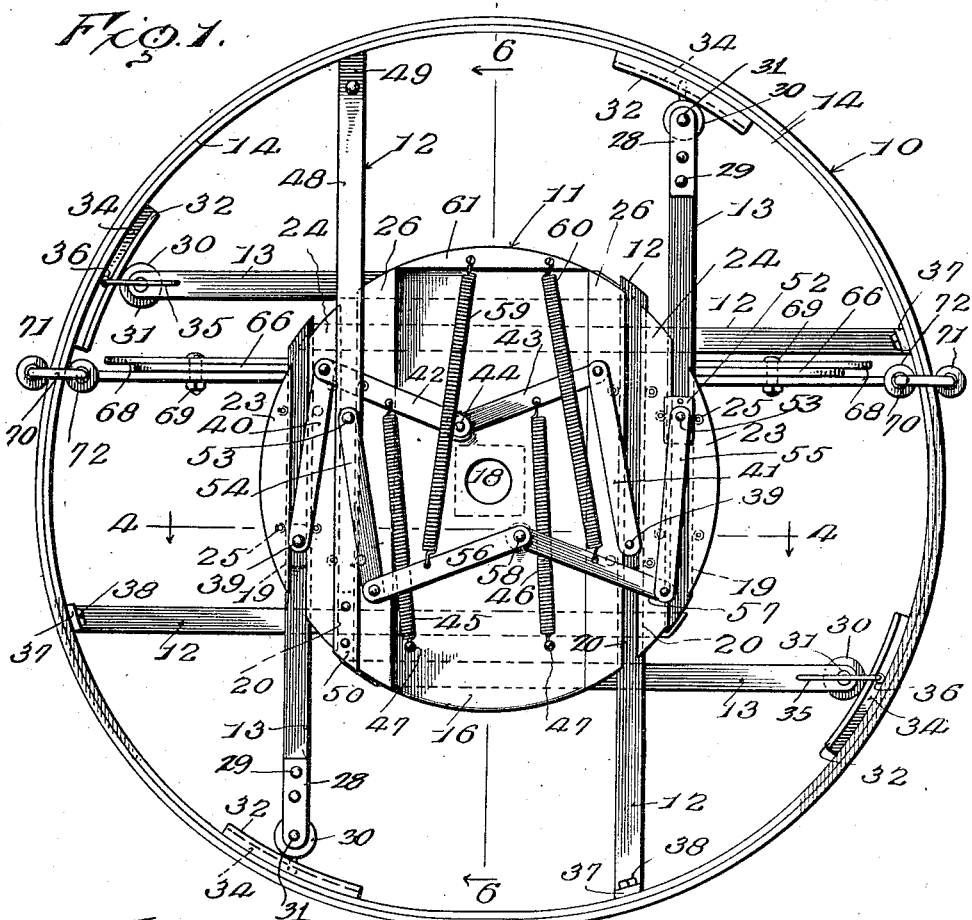

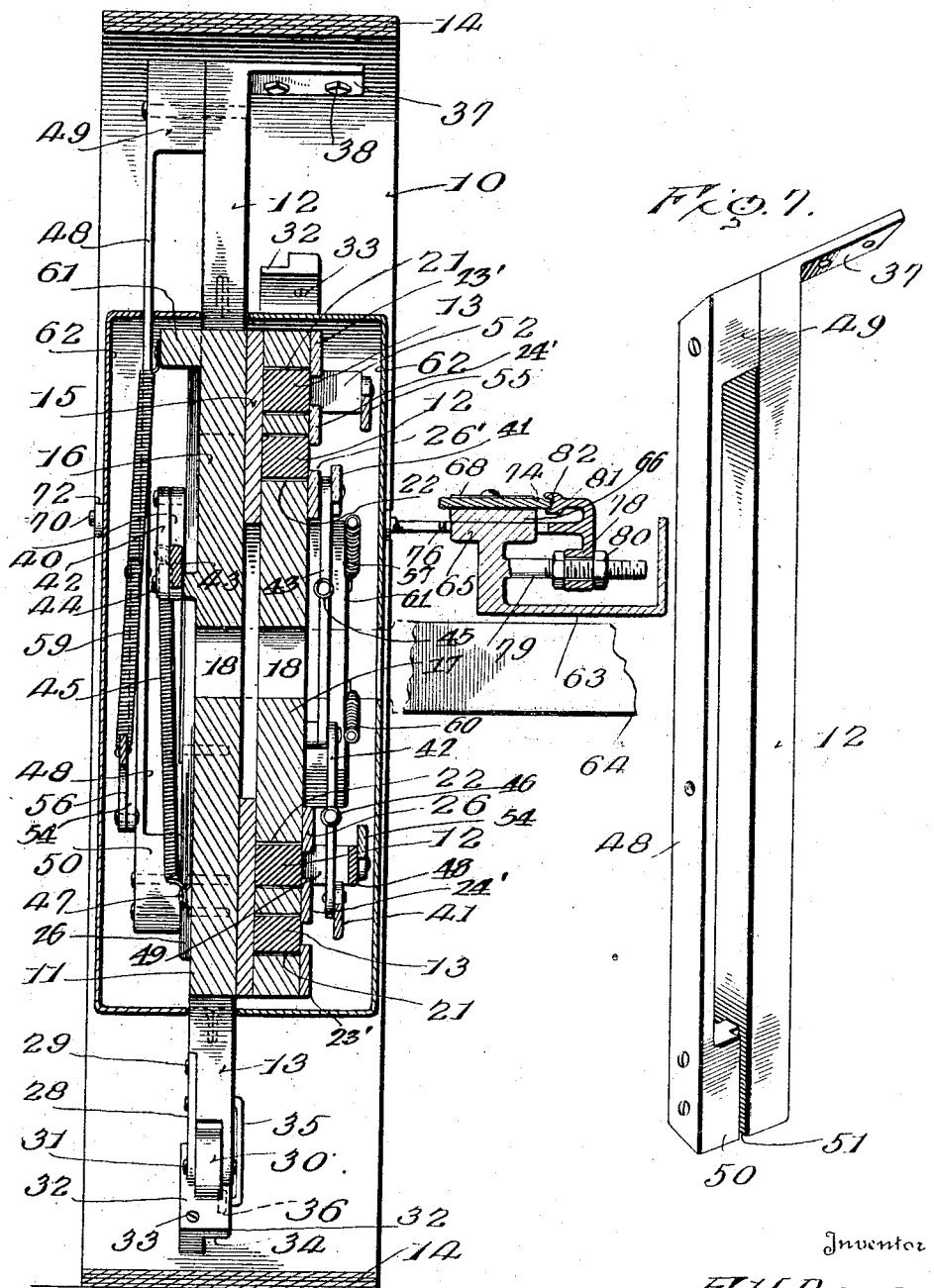

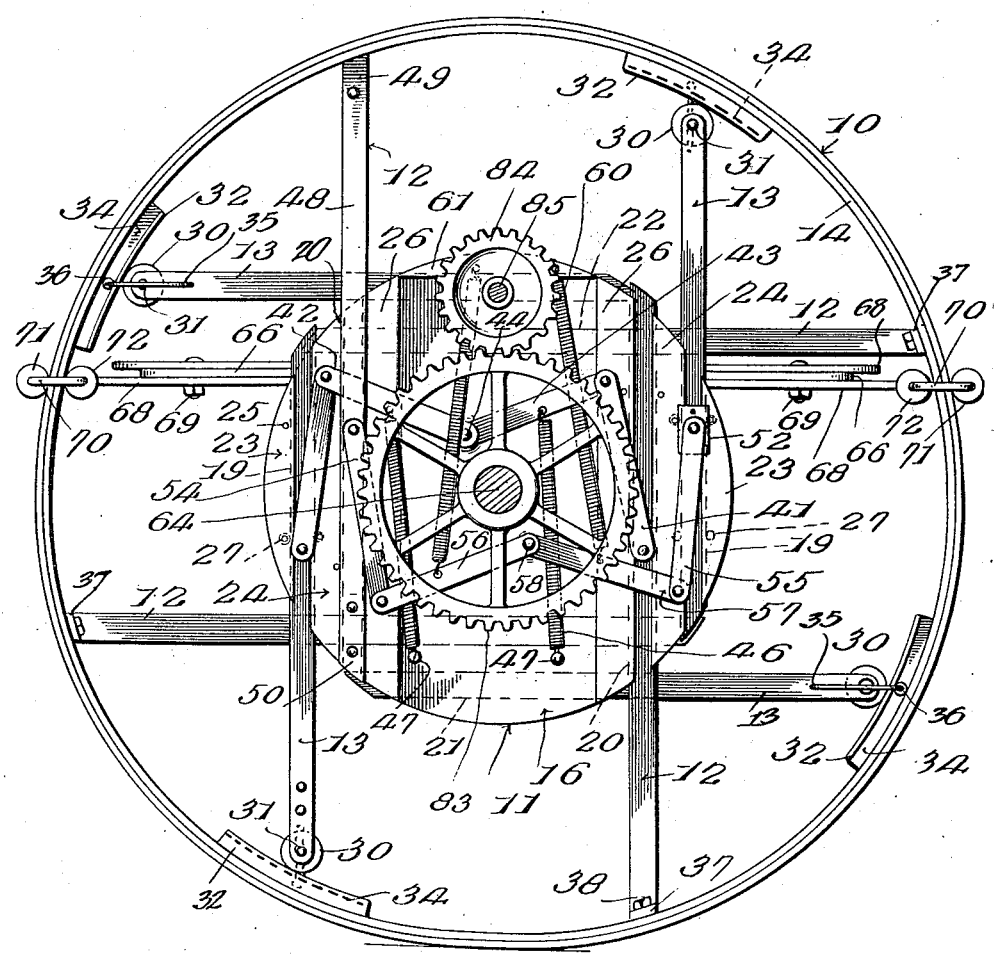

UNITED STATES PATENT OFFICE.

FREDERICK H. BAUER, OF FORT WORTH, TEXAS.

RESILIENT WHEEL.

1,287,185.  Specification of Letters Patent.  Patented Dec. 10, 1918.

Application filed November 13, 1917. Serial No. 201,838.

*To all whom it may concern:*

Be it known that I, FREDERICK H. BAUER, a citizen of the United States, residing at Fort Worth, in the county of Tarrant and State of Texas, have invented certain new and useful Improvements in Resilient Wheels, of which the following is a specification.

My invention relates to new and useful improvements in resilient wheels and more particularly resilient wheels for use in carrying heavy loads across soft, sandy or rough ground, being primarily intended for use upon farming machinery, trucks, gun carriages and the like.

One of the primary objects of the invention resides in providing a resilient wheel having a flexible yielding rim of relatively great width so constructed that it may flatten to a certain extent under a load to provide a large ground engaging surface so that a firm grip upon the road bed may be obtained and a large bearing surface to support the load provided.

A still further object of my invention resides in providing a novel connection between this rim and the hub consisting of a number of slides mounted in the hub, certain of which are disposed at right angles to the remainder, some of the slides being fixed at their outer ends to the rim and the remaining slides having roller abutment with the rim.

In this connection another object which I have in view is to provide toggle joint connections between the various slides and hub and to provide springs normally holding the toggle joint connections in one position so that movement of the slides through the hub, such as is necessary during distortion of the rim, will be opposed by the springs.

Another object which I have in view is the provision of means whereby the hub and correlated parts, such as the toggle mechanism and springs, may be inclosed in a housing to protect them from dirt and moisture.

A still further object of this invention resides in the provision of adjustable means for restraining the distortion of the wheel under any load imposed upon it.

With these and other objects in view, my invention will be more fully described, illustrated in the accompanying drawings, and then specifically pointed out in the claims which form a part of this application.

In the drawings—

Figure 1 is a side elevation of the wheel, the housing being omitted;

Fig. 2 is a top plan view of the same, partially in section;

Fig. 3 is a side elevation, looking at the opposite side from that shown in Fig. 1;

Fig. 4 is a transverse sectional view of the hub structure, taken on the line 4—4 of Fig. 1, looking in the direction of the arrows;

Fig. 5 is a fragmentary sectional view on the line 5—5 of Fig. 2 of the adjusting mechanism for restraining the distortion of the wheel;

Fig. 6 is a vertical sectional view taken on the line 6—6 of Fig. 1 looking in the direction of the arrows with the housing in position;

Fig. 7 is a perspective view of one of the slides having fixed connection with the rim.

Fig. 8 is a view similar to Fig. 1 illustrating an alternative construction, and also illustrating the relative positions of the parts under a load.

Corresponding and like parts are referred to in the following description and indicated in all the views of the drawings by the same reference characters.

My improved wheel consists primarily of a rim 10, hub 11, a plurality of slides 12 having fixed connection with the rim and sliding connection with the hub, and a plurality of slides 13 having roller abutment engagement with the rim and sliding engagement with the hub.

More specifically the rim is formed of a plurality of superimposed layers, bands, or rings of any suitable flexible resilient material such as steel or the like, these various bands being indicated by the numeral 14. Because of this structure any load imposed upon the rim may flatten that portion engaging the ground, the amount of flattening, of course, depending upon the weight of the load and also upon the resistance of certain controlling mechanism which will be later explained.

The main body of the hub 11 includes an intermediate disk 15 and front and rear slide receiving disks 16 and 17. The intermediate disk, as shown in Fig. 4, may be more in the nature of a ring, while the front and rear disks are formed centrally with spindle receiving bores 18 in order that the wheel may be mounted upon the axle 64. The front disk 16 is channeled or cut-away to provide a pair of parallel channels or slideways 19 adjacent diametrically opposite portions of its periphery and is further channeled to provide a second pair of slideways 20 which are parallel to the first and disposed somewhat closer to each other being located between the first slideways and the axle receiving bore 18. In like manner the opposite or back disk 17 is formed with slideways 21 and slideways 22 corresponding to the slideways 19 and 20 respectively, but extending at right angles to the slideways of the disk 16. Retaining strips 23 and 24 project at their edges partially across the outer faces of the slideways 19, being secured to the disk 16 by screws or bolts 25 or other suitable means. Furthermore, the opposite edges of the strips 24 extend partially across the slideways 20 with such edges spaced somewhat from the edges of coöperating strips 26 which extend partially across the slideways 20 from the opposite side. Similar strips 23', 24' and 26' are secured on the disk 17 in the same relative positions. The inner ends of the slides 12 are mounted in the slideways 20 and 22 respectively while the inner ends of the slides 13 are mounted in the slideways 19 and 21 respectively. Rollers 27 disposed in the side walls of the slideways at suitable intervals serve to support the various slides for free movement. The above described hub may be formed of any suitable material but is preferably constructed of metal in order to be sufficiently strong and durable and to offer as little friction as possible to the various slides.

Each slide 13 is preferably a bar of metal of suitable length and rectangular in cross section to correspond to the shape of the slideways, and the outer end thereof is cutaway to provide a seat for a bearing plate 28 which is secured to one side of the slide by fastening screws or bolts 29 and which projects at its outer end beyond the adjacent end of the slide. Furthermore each slide at its outer end is additionally cut-away in order that an abutment roller 30 may be mounted between its uncut-away portion and the bearing plate 28 upon a roller shaft 31 fixed in the end of the slide and in the bearing plate. The rollers of these various slides engage against the inner faces of arcuate wear plates 32 which are secured to the inner face of the rim 10, as shown at 33, and each of which at one side is undercut to provide a guideway 34. A bracket 35 is secured to each of these slides and has its free end inbent, and mounted upon such free end is a small anti-friction roller 36 which engages against the face of the guideway 34 so that the roller 30 will at all times be held in engagement with the wear plate 32 even though the rim is moving away from the hub. At this point it should be noted that the slides 13 in the front disk 16 extend from the hub in opposite directions to each other as also do the same slides of the hub disk 17. The slides 12 of each hub disk are each a simple bar, rectangular in cross-section to correspond to its slideway and secured to the rim at one end by a laterally directed bracket 37 and bolts 38.

Pivot bolts 39 connect links 40 and 41 with a slide 12 and a slide 13 respectively of the hub disk 16 which extend in the same direction toward the rim and links 42 and 43, pivoted to the ends of the links 40 and 41 respectively, are secured by a common pivot bolt 44 to the hub at such a point that in substantially normal position of the wheel the links 40 and 41 diverge slightly toward their respective points of connection with the slides, as clearly shown in Fig. 1. Helical springs 45 and 46 are secured at one end to the intermediate portions of the links 42 and 43 and at their opposite ends to the hub disk 16, as shown at 47, so that any movement of the slides 12 and 13 in a direction from their outer ends toward their inner ends will be resisted by said springs through the toggle mechanism consisting of the links 40, 42 and 41, 43.

The other slide 12 of the same hub disk is provided with a spacer bar 48 which extends in parallel spaced relation to its outer face and has an off-set head 49 which is secured to the outer end of the slide and an off-set head 50 which is secured to the inner end of the slide, this latter head having its side faces channeled, as shown at 51, to receive the strips 24 and 26. The other slide 13 of the same hub disk 16 carries a spacer block 52 which has its side edges channeled to receive the strips 23 and 24 as indicated in Fig. 1. Pivot bolts 53 connect links 54 and 55, one to the spacer strip 48 and one to the spacer block 52, and links 56 and 57 are pivotally connected to the free ends of the links 54 and 55 respectively and at their free ends are pivoted to each other and to a common spacer stud 58, as best shown in Fig. 4. By this means the links 54, 56 and 55, 57 making up toggle joint mechanisms, are free for movement over the links making up the toggle joint mechanisms first described. Springs 59 and 60 connected to the intermediate portions of the links 56 and 57 are connected at their free ends to a bracket 61 secured to the hub disk 16.

The slides of the hub disk 17 are joined by toggle joint mechanisms having springs acting thereon. As the structure is identical with that just described in connection with the disk 16 repetition of the description is unnecessary and the corresponding parts have been given like reference numerals upon the drawings. A suitable housing 62 of any suitable design and preferably of sheet metal is arranged to inclose the hub and attached mechanisms, being slotted for the proper movement of the slides. While this housing is not an absolute essential I prefer its use as it not only protects the inclosed parts from dirt and moisture but also from injury or displacement such as might occur if the vehicle is driven through bushes or other obstructions.

The operation of the above described wheel will be readily understood. Any load imposed upon the hub will, of course, be transmitted through the slides to the flexible resilient rim with the result that flattening of the rim will be caused at its point of contact with the ground, this flattening being partially resisted through the resiliency of the rim itself and partially through the strain exerted upon the various springs of the wheel hub through their connection between the toggle mechanisms of the particular slides in substantially vertical alinement with the ground. Obviously as the wheel revolves the resiliency of the rim and springs combined will tend to return the flattened portion of the rim to normal position so that the wheel will be substantially circular at all times save for the flattened portion engaging the ground.

Of course, it will doubtless be appreciated that wheels of this character should be positively driven rather than mounted for idle turning upon the axle, as if mounted for idle turning there will be a tendency for the wheels to drag along the ground rather than to revolve.

In many instances it is advisable, particularly when especially heavy loads are to be employed, to provide means for restraining distortion of the wheel, and such means is most efficient if adjustable. In Figs. 1, 2, 5, 6 and 8 I have illustrated means for accomplishing this object. A bracket 63 is secured to any part of the vehicle which will maintain the same relative position with respect to the axle 64 and has an upturned head 65 to which is secured an intermediate supporting plate 66 extending parallel to the plane of the rear face of the wheel and formed at either side of the bracket with longitudinally extending slots 67. Contractor arms 68 engage against the upper and lower faces of the ends of the plates 66 and are apertured to receive bolts 69 whereby the contractor plates are movable toward and away from each other along the intermediate plate 66. The outer ends of the contractor arms or plates carry brackets 70 which journal rollers 71 engaging against the peripheral outer face of the rim and smaller rollers 72 engaging against the inner peripheral face of the rim at either side. Obviously, if the contractor arms are held in any fixed position the wheel rim must follow the path set by the rollers and will be, consequently, restrained against excessive spreading or distortion, while at the same time the rollers will in no way interfere with the turning of the wheel.

The inner ends of the upper sections of the arms are cut at opposed angles, as shown at 73, being also undercut as indicated in Fig. 5, to receive the beveled angularly disposed edges of a wedge 74 so that the contractor arms may be forced away from each other to any desired extent, within the limits of the wedge. The lower sections of the contractor arms are formed with depending ribs 75 (see Fig. 5) at their inner ends extending at correspondingly opposed angles to each other to be engaged by the arms 76 of a contractor clamp 77. This clamp is substantially U-shaped save that its arms converge toward their free ends to correspond to the angularity of the ribs 75, and the clamp is preferably formed as an offset portion of an adjusting sleeve 78 which is threaded upon an adjusting screw 79 projecting laterally from the bracket 63. Nuts 80 threaded upon the adjusting screw 79, one against either end of the sleeve, serve as a means for both adjusting the position of the sleeve and consequently of the contractor clamp 77, and as a means for securing such parts in adjusted position. The sleeve has a further off-set portion 81 projecting above the clamp 77 and having one face channeled at 82 to provide a seat firmly engaging the wider edge of the wedge 74. With this arrangement it will be apparent that by proper manipulation of the nuts 80 the sleeve 78 may be moved toward the head 65, providing the intermediate portion of the clamp 77 is sufficiently spaced from the contractor arms, to move the arms of the contractor clamp out of engagement with the ribs and to at the same time force the wedge 74 inwardly to spread the contractor arms so that their ribs will engage the clamp. Reverse action will, of course, force the wedge outwardly and cause the contractor clamp to draw the arms toward each other. By this means the space at which the opposite rollers 71 are set may be readily varied at will and the parts may be firmly locked in adjusted position.

In Fig. 8 means are shown for positively rotating the wheel regardless of the degree of distortion under the load. This consists in attaching a gear wheel 83 to the axle 64 and mounting a pinion 84 upon a stub shaft 85 supported in any suitable manner on the framework of the vehicle, not shown. The driving power from the motor is to be applied to the shaft 85 instead of to the axle 64.

Having thus described the invention, what is claimed as new is:

1. A resilient wheel including a flexible rim adapted to be distorted under strain, a hub, and a plurality of members having sliding engagement with the hub, certain of the members at their outer ends being fixed to the rim and certain of the members at their outer ends abutting against the rim.

2. A resilient wheel including a flexible rim adapted to be distorted under strain, a hub, a plurality of members having sliding engagement at their inner ends with the hub, certain of the members being fixed at their outer ends to the rim, and rollers carried by the outer ends of the other members and engaging the rim.

3. A resilient wheel including a flexible resilient rim adapted to be distorted under strain, a hub, a plurality of parallel members having sliding engagement with the hub, one pair of such members having their oppositely directed ends fixed to the rim and the other pair of such members having their oppositely directed ends abutting against the rim, and a plurality of additional members corresponding to the first and correspondingly mounted but at right angles to the first.

4. A resilient wheel including a resilient flexible rim adapted to be distorted under strain, a hub, a plurality of members slidably mounted in the hub, the free ends of certain of said members being fixed to the rim, a plurality of rollers carried by the free ends of the remaining members and engaging the rim, and resilient means acting to hold the members in predetermined position.

5. A resilient wheel including a resilient flexible rim adapted to be distorted under strain, a hub, a plurality of members slidably mounted in the hub, the free ends of certain of said members being fixed to the rim, a plurality of rollers carried by the free ends of the remaining members and engaging the rim, and resilient means acting to hold the members in predetermined position, said resilient means including toggle joint mechanisms connecting the several members with the hub, and springs connected at one end to the hub and at their opposite ends to certain portions of the toggle joint mechanisms.

6. A resilient wheel including a rim formed of a plurality of superimposed layers of flexible resilient material, a hub having a plurality of slideways, a plurality of slides mounted one in each of the slideways, certain of the slides being parallel to each other and extending at right angles to the remaining slides, fastening means between the free ends of certain of both groups of the slides and the rim, and rollers carried by the free ends of the remaining slides and engaging against the inner face of the rim.

7. A resilient wheel including a rim formed of a plurality of superimposed layers of flexible resilient material, a hub having a plurality of slideways, a plurality of slides mounted one in each of the slideways, certain of the slides being parallel to each other and extending at right angles to the remaining slides, fastening means between the free ends of certain of both groups of the slides and the rim, rollers carried by the free ends of the remaining slides, wear members secured to the inner face of the rim to be engaged by the rollers and each having an undercut edge, and arms mounted upon the roller carrying slides and having lateral terminals carrying rollers engaging beneath the undercut shoulders of the wear members.

8. A resilient wheel including a resilient flexible rim capable of being flattened under load, a hub, sliding elements coöperating between the hub and rim and operatively engaging the two, springs holding the sliding elements in a predetermined position with respect to the hub and rim, and means for restraining the distortion of the rim.

9. A resilient wheel including a resilient flexible rim capable of being flattened under load, a hub, sliding elements coöperating between the hub and rim and operatively engaging the two, springs holding the sliding elements in a predetermined position with respect to the hub and rim, and means for restraining the distortion of the rim, said means being adjustable.

10. A resilient wheel including a resilient flexible rim capable of being flattened under load, a hub, sliding elements coöperating between the hub and rim and operatively engaging the two, springs holding the sliding elements in a predetermined position with respect to the hub and rim, and means for restraining the distortion of the rim, said means including horizontally disposed members adjustable toward and away from each other, means for securing the members in adjusted position, and rollers carried by the members and engaging against the outer face of the rim at substantially diametrically opposed points.

11. A resilient wheel including a resilient flexible rim capable of being flattened under load, a hub, sliding elements coöperating between the hub and rim and operatively engaging the two, springs holding the sliding elements in a predetermined position with respect to the hub and rim, and means for restraining the distortion of the rim, said means including horizontally disposed members adjustable toward and away from each other, means for securing the members in adjusted position, rollers carried by the members and engaging against the outer face of the rim at substantially diametrically opposed points, and additional rollers carried by such members and engaging against the edge portions of the inner peripheral face of the rim.

12. The combination with a resilient wheel having a rim capable of flattening under a load, of adjustable means to restrain distortion of the rim, said means including a bracket, a supporting plate carried by the bracket with its end portion slotted, arms to engage above and below the slotted ends of the plate and slidable toward and from each other, fastening devices passed through the arms and the slots of the plate to guide the sliding action of the arms with respect to the plate, roller elements carried by the arms and engaging against the inner and outer peripheral faces of the rim of the wheel, and means carried by the bracket for securing the arms against movement toward and away from each other.

13. The combination with a resilient wheel having a rim capable of flattening under a load, of adjustable means to restrain distortion of the rim, said means including a bracket, a supporting plate carried by the bracket with its end portion slotted, arms to engage above and below the slotted ends of the plate and slidable on the plate, fastening devices passed through the arms and the slots of the plate to guide the sliding action of the arms with respect to the plate, roller elements carried by the arms and engaging against the inner and outer peripheral faces of the rim of the wheel, and means carried by the bracket including a substantially U-shaped contractor clamp the arms of which converge toward their free ends, correspondingly converging ribs formed upon the adjacent ends of the arms at one side of the plate and engaged by the arms of the clamp, the corresponding ends of the arms above the plate being correspondingly beveled, a wedge engaging between such beveled ends, a sleeve carried by the clamp and having an abutment engaging against the wedge, a threaded adjusting screw upon which the sleeve operates and clamping nuts upon the screw engaging opposite ends of the sleeve.

In testimony whereof I affix my signature.

FREDERICK H. BAUER. [L. S.]

Copies of this patent may be obtained for five cents each, by addressing the "Commissioner of Patents, Washington, D. C."